Patented July 12, 1949

2,475,802

UNITED STATES PATENT OFFICE 2,475,802

MOLDING COMPOSITION

Harold A. Osserman, New York, N. Y., assignor to Dictograph Products Company, Inc., New York, N. Y., a corporation of Delaware No Drawing. Application March 7, 1945,
Serial No. 581,551

5 Claims. (Cl. 260—17)

This invention relates to molding compositions and has particular reference to compositions that can be molded in a cold condition and which harden upon standing.

The compositions are particularly useful for making impressions of the ear cavity in order to permit the preparation of suitable custom-fitted earphones and the like for hearing aid devices, for taking dental impressions preparatory to making inlay castings, and in making other models or castings.

Impressions of the ear cavity have been made heretofore by means of such materials as plaster. The use of such materials has left much to be desired from the standpoint of ease of handling and precision of the impression.

In preparing an impression or casting with the use of plaster, it is necessary to shave the ear and clean it thoroughly before applying the plaster in a pasty form to the ear. As the plaster sets, it generates heat which may be uncomfortable for the person being treated.

If the diameter of the canal in the ear varies, it is difficult to remove the hardened plaster impression for the reason that it is rigid and inflexible, and oftentimes the impression breaks, leaving a piece of plaster in the ear canal. All of these disadvantages of the plaster type of impression have been recognized heretofore, but plaster is still used commonly because no better material has been produced for this purpose.

An object of the present invention is to provide an improved type of cold molding plastic material which can be applied easily to the ear or other cavity without substantial preparation or pretreatment of the cavity.

Another object of the invention is to prepare a cold molding plastic composition which may be readily mixed and applied to cavities and which will set in a semi-elastic and cohesive condition at an intermediate stage of its hardening.

Another object of the invention is to provide a cold molding plastic material that will set quickly to a semi-elastic condition, thereby permitting its use in and removal from irregular cavities without discomfort or danger of breaking.

Another object of the invention is to provide a cold molding plastic which does not shrink or expand appreciably during hardening.

Other objects of the invention will become apparent from the following description of typical compositions embodying the present invention.

In accordance with the present invention, a plastic composition is provided which consists essentially of a mixture of methyl methacrylate polymer and ethyl cellulose in suitable proportions, dissolved in or rendered plastic and easily moldable by the addition thereto of a solvent for the polymer and the ethyl cellulose.

It has been found that when methyl methacrylate polymers are dissolved in a solvent such as acetone and used as a molding composition, the polymer tends to shrink away from the molding cavity as the solvent evaporates, thereby rendering it unsuitable for taking impressions of the ear cavity or for other uses wherein precision molding is required.

The addition of ethyl cellulose to methyl methacrylate polymers overcomes this tendency of the polymer to shrink upon setting and thereby provides a cold molding composition that is eminently suited for application to molds or to cavities in the human body, for example. The composition is semi-elastic or resilient at certain stages of its hardening and, therefore, can be used in cavities having undercut or irregular walls that would prevent removal of a hard or rigid mass fitting in the cavity. The resiliency of the composition is such that even though the partially set composition is distorted by removal from the cavity, it will return to its initial shape.

Upon continued evaporation of the solvent, the plastic will set to a hardened condition which is sufficiently strong to permit its use as a model for the preparation of earphones, tooth fillings, jewelry settings and the like.

For best results, it has been found desirable to include in the solvent for the methyl methacrylate and the ethyl cellulose a small amount of a fixed oil such as, for example, olive oil, mineral oil or cotton seed oil, which acts as a lubricant for the semi-hardened molding composition and facilitates its removal from the cavity.

The proportions of the methyl methacrylate polymer and the ethyl cellulose can be varied considerably. For example, suitable dry molding compositions may contain between three and twenty-five per cent by weight of ethyl cellulose, and between ninety-seven and seventy-five per cent by weight of methyl methacrylate poylmer.

The preferred composition which is particularly suitable for making casts or models of the ear cavities contains about ninety-three per cent by weight of methyl methacrylate polymer and about seven per cent by weight of ethyl cellulose.

The solvent used in preparing a plastic mixture of the two above identified ingredients may consist of acetone or a mixture of acetone and a fixed oil of the type described above. As much as 10% of the fixed oil may be present in the solution.

The molding composition may be prepared by mixing a powdered methyl methacrylate polymer and ethyl cellulose in the proportions specified above with the solvent solution until as much of the powder is absorbed in the solvent as the latter will absorb. The mixture is then thoroughly agitated until tiny threads appear in the solution.

The ear of a patient or other cavity is then lubricated with a thin oil or with "Vaseline" or other similar lubricating material and the soft plastic material is then packed into the cavity. If an impression of an ear is being taken, the material is applied in sufficient quantity to fill the ear canal and cavity, including the interior convolutions of the exterior ear. The plastic material is then allowed to set in the ear for about ten or fifteen minutes at which time, aided by the warmth of the ear, it has attained a self-sustaining and semi-elastic and cohesive state. Usually twelve minutes is sufficient. At this time, the partially set or hardened material is withdrawn from the ear. This can be accomplished without difficulty because the composition does not adhere to the ear and can be distorted sufficiently to permit its easy withdrawal. If the partially set mold has been distorted, during removal from the ear, it will return substantially immediately to its correct size and shape because of its rubbery characteristic. Hardening of the composition to a rigid condition will require about an hour, at the end of which time it is sufficiently hard to permit its shipment or its use as a model for the making of hearing aid devices and the like.

The same procedure may be followed in taking impressions of dental cavities for preparing inlay castings and the like.

The plastic composition is susceptible to considerable modification as indicated above and it also may be prepared with modified types of solvents, for example, a mixture of equal parts of acetone and methyl methacrylate monomer may be used with ethyl cellulose and the polymer. This composition is not as suitable for dental castings but may be used for other purposes. Inasmuch as the plastic composition embodying the present invention can be modified considerably without departing from the invention, the above-described embodiments of the invention should be considered as illustrative and not as limiting the scope of the following claims.

I claim:

1. A molding composition consisting essentially of between approximately 75 and 97% by weight of methyl methacrylate polymer, between approximately 3 and 25% by weight of ethyl cellulose and as much acetone as the mixture will absorb to render said composition plastic.

2. A molding composition consisting essentially of between about 75 and 97% by weight of methyl methacrylate polymer, between approximately three and 25% by weight of ethyl cellulose, and rendered readily moldable by inclusion of a solution containing between approximately 90 and 99% acetone and between approximately 1% and 10% of a fixed oil, the amount of acetone included being as much as the mixture will absorb.

3. A molding composition consisting essentially of about 93% by weight of methyl methacrylate polymer, about 7% by weight of ethyl cellulose and rendered readily moldable by inclusion of a solution containing about 97% acetone and about 3% of a fixed oil, the amount of acetone included being as much as the mixture will absorb.

4. A molding composition consisting essentially of between approximately 75 and 97% by weight of methyl methacrylate polymer, between approximately three and 25% by weight of ethyl cellulose, and rendered readily moldable by inclusion of as much volatile solvent as the mixture will absorb.

5. A molding composition consisting essentially of about 93% by weight of methyl methacrylate polymer, about 7% by weight of ethyl cellulose and rendered readily moldable by inclusion of as much volatile solvent as the mixture will absorb.

HAROLD A. OSSERMAN.

REFERENCES CITED

The following references are of record in the file of this patent:

FOREIGN PATENTS

| Number | Country | Date |
| --- | --- | --- |
| 482,194 | Great Britain | Mar. 21, 1938 |